United States Patent
Hacker et al.

(10) Patent No.: US 6,359,099 B1
(45) Date of Patent: Mar. 19, 2002

(54) ORGANOHYDRIDOSILOXANE RESINS WITH LOW ORGANIC CONTENT

(75) Inventors: Nigel P. Hacker, San Martin; Scott Lefferts, Sunnyvale; Lisa Figge, Menlo Park, all of CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/610,567

(22) Filed: Jul. 3, 2000

Related U.S. Application Data

(62) Division of application No. 09/044,831, filed on Mar. 20, 1998, now Pat. No. 6,218,497
(60) Provisional application No. 60/044,482, filed on Apr. 21, 1997.

(51) Int. Cl.[7] .......................... C08G 77/12; C08G 77/08
(52) U.S. Cl. ......................................... 528/21; 528/31
(58) Field of Search ................................... 528/21, 31

(56) References Cited

U.S. PATENT DOCUMENTS

| | | | |
|---|---|---|---|
| 2,637,718 A | 5/1953 | Rust | 260/46.5 |
| 3,615,272 A | 10/1971 | Collins et al. | 423/325 |
| 4,026,868 A | 5/1977 | Merrill | 260/46.5 |
| 4,399,266 A | 8/1983 | Matsumura et al. | 528/10 |
| 4,609,751 A | 9/1986 | Hajjar | 556/456 |
| 4,624,870 A | 11/1986 | Anthony | 427/387 |
| 4,626,556 A | 12/1986 | Nozue et al. | 522/99 |
| 4,670,299 A | 6/1987 | Fukuyama et al. | 427/96 |
| 4,694,040 A | 9/1987 | Hashimoto et al. | 524/765 |
| 4,723,978 A | 2/1988 | Clodgo et al. | 65/31 |
| 4,749,631 A | 6/1988 | Haluska et al. | 428/704 |
| 4,753,855 A | 6/1988 | Haluska et al. | 428/702 |
| 4,756,977 A | 7/1988 | Haluska et al. | 428/704 |
| 4,808,653 A | 2/1989 | Haluska et al. | 524/398 |
| 4,822,697 A | 4/1989 | Haluska et al. | 428/698 |
| 4,847,162 A | 7/1989 | Haluska et al. | 428/457 |
| 4,849,296 A | 7/1989 | Haluska et al. | 428/457 |
| 4,895,914 A | 1/1990 | Saitoh et al. | 525/474 |
| 4,898,907 A | 2/1990 | Haluska et al. | 524/490 |
| 4,911,992 A | 3/1990 | Haluska et al. | 428/698 |
| 4,973,526 A | 11/1990 | Haluska | 428/697 |
| 4,999,397 A | 3/1991 | Weiss et al. | 524/755 |
| 5,008,320 A | 4/1991 | Haluska et al. | 524/361 |
| 5,010,159 A | 4/1991 | Bank et al. | 528/23 |
| 5,045,592 A | 9/1991 | Weiss et al. | 524/755 |
| 5,059,448 A | 10/1991 | Chandra et al. | 427/53.1 |
| 5,063,267 A | 11/1991 | Hanneman et al. | 524/284 |
| 5,085,893 A | 2/1992 | Weiss et al. | 427/387 |
| 5,091,162 A | 2/1992 | Frye et al. | 423/325 |
| 5,106,604 A | 4/1992 | Agaskar | 423/325 |
| 5,116,637 A | 5/1992 | Baney et al. | 427/340 |

(List continued on next page.)

FOREIGN PATENT DOCUMENTS

| | | |
|---|---|---|
| CA | 2100278 | 1/1994 |
| DE | 196 08 904 A1 | 9/1996 |
| EP | 0 270 229 A2 A3 | 6/1988 |
| EP | 0 270 231 A2 A3 | 6/1988 |
| EP | 0 270 262 A2 A3 | 6/1988 |
| EP | 0 270 369 A2 A3 | 6/1988 |
| EP | 0 323 103 A2 | 7/1989 |
| EP | 0 323 186 A2 | 7/1989 |
| EP | 0 410 564 A2 A3 | 1/1991 |
| EP | 0 419 076 A1 | 3/1991 |
| EP | 0 427 395 A1 | 5/1991 |
| EP | 0 462 715 A1 | 12/1991 |
| EP | 0 461 782 A2 A3 | 12/1991 |
| EP | 0 466 205 A1 | 1/1992 |
| EP | 0 493 879 A2 A3 | 7/1992 |
| EP | 0 510 872 A1 | 10/1992 |
| EP | 0 512 717 A2 A3 | 11/1992 |
| EP | 0 516 144 A1 | 12/1992 |
| EP | 0 516 308 A1 | 12/1992 |
| EP | 0 560 485 A1 | 9/1993 |
| EP | 0 576 166 A2 | 12/1993 |
| EP | 0 596 678 A2 | 5/1994 |
| EP | 0 599 209 A2 A3 | 6/1994 |
| EP | 0 604 779 A1 | 7/1994 |
| EP | 0 606 580 A1 | 7/1994 |
| EP | 0 606 588 A1 | 7/1994 |
| EP | 0 615 000 A1 | 9/1994 |
| EP | 0 616 001 A1 | 9/1994 |
| EP | 0 652 246 A1 | 5/1995 |
| EP | 0 686 680 A1 | 12/1995 |
| EP | 0 725 103 A2 A3 | 8/1996 |
| GB | 2 199 817 A | 7/1988 |
| JP | 52-31854 | 8/1977 |
| JP | 53-88099 | 8/1978 |
| JP | 55-111148 | 8/1980 |
| JP | 56-139533 | 10/1981 |
| JP | 57-112047 | 7/1982 |
| JP | 58-003249 | 1/1983 |
| JP | 58-066335 | 4/1983 |

(List continued on next page.)

OTHER PUBLICATIONS

*Encyclopedia of Chemical Technology*, 4th Edition, John Wiley & Sons, Inc., 1995, vol. 14, p. 177.
Hacker, N., "Organic and Inorganic Spin–On Polymers for Low–Dielectic–Constant Applications," *MRS Bulletin*, vol. 22, No. 10, Oct. 1997, pp. 33–38.

*Primary Examiner*—David W. Wu
*Assistant Examiner*—Caixia Lu
(74) *Attorney, Agent, or Firm*—Fish & Associates, LLP; Robert D. Fish

(57) ABSTRACT

An organohydridosiloxane polymer having a cage conformation, between approximately 0.1 to 40 mole percent carbon-containing substituent, and a dielectric constant of less than about 3.0 is disclosed. Each silicon atom of the cage polymer is bonded to at least three oxygen atoms and to either a hydrogen atom or an organic substituent. By providing such a caged structure having essentially no hydroxyl or alkoxy substituents, either on the polymer backbone or at terminal silicon atoms, essentially no chain lengthening polymerization can occur in solution. Such organohydridosiloxane resins having a molecular weight in the range from about 400 to about 200,000 atomic mass units were formed using a dual phase solvent system and either a solid phase or a phase transfer catalyst to assist the condensation of hydridotrihalosilane with at least one organotrihalosilane.

26 Claims, No Drawings

U.S. PATENT DOCUMENTS

| | | | | |
|---|---|---|---|---|
| 5,118,530 | A | 6/1992 | Hanneman et al. | 427/226 |
| 5,145,723 | A | 9/1992 | Ballance et al. | 427/397.7 |
| 5,165,955 | A | 11/1992 | Gentle | 427/575 |
| 5,183,684 | A | 2/1993 | Carpenter | 427/574 |
| 5,210,168 | A | 5/1993 | Bergstrom et al. | 528/12 |
| 5,238,787 | A | 8/1993 | Haluska et al. | 430/325 |
| 5,258,334 | A | 11/1993 | Lantz, II | 437/238 |
| 5,262,201 | A | 11/1993 | Chandra et al. | 427/376.2 |
| 5,279,661 | A | 1/1994 | Gentle | 106/287.1 |
| 5,283,545 | A | 2/1994 | Pernisz | 338/308 |
| 5,290,354 | A | 3/1994 | Haluska | 106/479 |
| 5,293,335 | A | 3/1994 | Pernisz et al. | 365/148 |
| 5,310,583 | A | 5/1994 | Eckstein et al. | 427/575 |
| 5,312,684 | A | 5/1994 | Michael et al. | 428/336 |
| 5,320,868 | A | 6/1994 | Ballance et al. | 427/228 |
| 5,336,532 | A | 8/1994 | Haluska et al. | 427/515 |
| 5,348,839 | A | 9/1994 | Haluska et al. | 430/270 |
| 5,370,903 | A | 12/1994 | Mine et al. | 427/126.2 |
| 5,370,904 | A | 12/1994 | Mine et al. | 427/126.2 |
| 5,372,842 | A | 12/1994 | Mine et al. | 427/126.2 |
| 5,380,567 | A | 1/1995 | Haluska | 427/577 |
| 5,416,190 | A | 5/1995 | Mine et al. | 528/492 |
| 5,436,029 | A | 7/1995 | Ballance et al. | 427/126.2 |
| 5,441,765 | A | 8/1995 | Ballance et al. | 427/228 |
| 5,445,894 | A | 8/1995 | Ballance et al. | 427/228 |
| 5,446,088 | A | 8/1995 | Haluska | 524/588 |
| 5,486,564 | A | 1/1996 | Mine et al. | 524/588 |
| 5,523,163 | A | 6/1996 | Ballance et al. | 428/446 |
| 5,540,948 | A | 7/1996 | Haluska | 427/96 |
| 5,547,703 | A | 8/1996 | Camilletti et al. | 427/126.3 |
| 5,609,925 | A | 3/1997 | Camilletti et al. | 427/503 |
| 5,618,878 | A | 4/1997 | Syktich et al. | 524/588 |
| 5,635,240 | A | 6/1997 | Haluska et al. | 427/180 |
| 5,670,596 | A | 9/1997 | Razzano et al. | 528/16 |
| 5,707,681 | A | 1/1998 | Bremmer et al. | 427/58 |
| 5,707,683 | A | 1/1998 | Currie et al. | 427/126.2 |
| 5,853,808 | A | 12/1998 | Arkles et al. | 427/377 |
| 5,858,544 | A | 1/1999 | Holl et al. | 428/447 |
| 5,859,162 | A | 1/1999 | Yamamoto et al. | 528/31 |
| 5,859,168 | A | 1/1999 | Yamamoto et al. | 528/31 |

FOREIGN PATENT DOCUMENTS

| | | |
|---|---|---|
| JP | 59-109565 | 6/1984 |
| JP | 59-189126 | 10/1984 |
| JP | 59-190211 | 10/1984 |
| JP | 60-42426 | 3/1985 |
| JP | 60-86017 | 5/1985 |
| JP | 60-124943 | 7/1985 |
| JP | 61-029153 | 2/1986 |
| JP | 61-127732 | 6/1986 |
| JP | 61-292342 | 12/1986 |
| JP | 2-277255 | 11/1990 |
| JP | 3-6845 | 1/1991 |
| JP | 3-227321 | 10/1991 |
| JP | 4-252228 | 9/1992 |
| JP | 4-252229 | 9/1992 |
| WO | WO 97/10282 | 3/1997 |

ORGANOHYDRIDOSILOXANE RESINS WITH LOW ORGANIC CONTENT

CROSS REFERENCE TO RELATED APPLICATIONS

This application is a division of U.S. application Ser. No. 09/044,831, filed Mar. 20, 1998, now U.S. Pat. No. 6,218,497 which is the non-provisional application of related provisional application entitled "HYDROGENSILOXANE RESINS WITH LOW ORGANIC CONTENT," provisional Ser. No. 60/044,482, filed on Apr. 21, 1997 the benefit of whose priority date is hereby claimed, and the disclosure of which is incorporated by reference herein.

This application is also related to U.S. application Ser. No. 09/044,798, filed Mar. 28, 1998, now U.S. Pat. No. 6,143,855 and the divisional application thereof [docket number 30-4305DIV1], co-filed with this application.

BACKGROUND OF THE INVENTION

1. Field of the Invention

The present invention relates generally to siloxane based resins, and more specifically to a caged conformation organohydridosiloxane composition, methods for the synthesis thereof, and low dielectric constant films formed therefrom.

2. Description of the Related Art

Semiconductor devices often have one or more arrays of patterned interconnect levels that serve to electrically couple the individual circuit elements thus forming an integrated circuit (IC). These interconnect levels are typically separated by an insulating or dielectric film. Previously, a silicon oxide film formed using chemical vapor deposition (CVD) or plasma enhanced CVD (PECVD) techniques was the most commonly used material for such dielectric films. However, as the size of circuit elements and the spaces between such elements decreases, the relatively high dielectric constant of such silicon oxide films is problematic.

In order to provide a lower dielectric constant than that of silicon oxide, dielectric films formed from siloxane based resins are becoming widely used. One such family of films formed from siloxane based resins are the films derived from hydrogen siloxane (HSQ) resins (See, U.S. Pat. No. 3,615,272, Oct. 19, 1971, Collins et al.; and U.S. Pat. No. 4,756,977, Jul. 12, 1988, Haluska et al.) However, while such films do provide lower dielectric constants than CVD or PECVD silicon oxide films and also provide other benefits such as gap filling and surface planarization, it has been found that typically the dielectric constants of such films are limited to approximately 3.0 or greater (See, U.S. Pat. No. 5,523,163, Jun. 4, 1996, Ballance et al.).

As known, the dielectric constant of such insulating films is an important factor where IC's with low power consumption, cross-talk, and signal delay are required. As IC dimensions continue to shrink, this factor increases in importance. As a result, siloxane based resin materials, and methods for making such materials, that can provide insulating films with dielectric constants below 3.0 are very desirable. In addition, it would be desirable to have a siloxane based resin, and method for making the resin, that provides such low dielectric constant films which additionally have a high resistance to cracking. It would also be desirable for such films to have low stress when formed in thicknesses of approximately 1.0 micron ($\mu$m) or greater. It would also be desirable for such a siloxane based resin, and method for making, to provide low dielectric constant films via standard processing techniques. In this manner curing processes that require an ammonia or ammonia derivative type of atmosphere, or other non-standard type of semiconductor process, are avoided.

SUMMARY

In accordance with the present invention, organohydridosiloxane resins, and methods for making such resin, are provided. Solutions of such organohydridosiloxane resins are employed for forming caged siloxane polymer films useful in the fabrication of a variety of micro-electronic devices, particularly semiconductor integrated circuits.

The organohydridosiloxane resins of the present invention have the general formulas:

| | |
|---|---|
| $(HSiO_{1.5})_n(RSiO_{1.5})_m$ | Formula (1) |
| $H_{0.4-1.0}SiO_{1.5-1.8})_n(R_{0.4-1.0}SiO_{1.5-1.8})_m$ | Formula (2) |
| $H_{0-1.0}SiO_{1.5-2.0})_n(RSiO_{1.5})_m$ | Formula (3) |
| $HSiO_{1.5})_x(RSiO_{1.5})_y(SiO_2)_z$ | Formula (4) | wherein:

the sum of n and m, or the sum or x, y and z is from about 8 to about 5000, and m or y is selected such that carbon containing constituents are present in an amount of less than about 40 percent that is between about 0.1 and 40 percent; R is selected from substituted and unsubstituted, normal and branched alkyls, cycloalkyls, aryls, and mixtures thereof; and wherein the specific mole percent of carbon containing substituents is a function of the ratio of the amounts of starting materials. In some embodiments, particularly favorable results are obtained with the mole percent of carbon containing substituents being in the range of between about 15 mole percent to about 25 mole percent.

Polymers in accordance with the present invention have a polymer backbone encompassing alternate silicon and oxygen atoms. In contrast with previously known organosiloxane resins, polymers of the present invention have essentially no hydroxyl or alkoxy groups bonded to backbone silicon atoms. Rather, each silicon atom, in addition to the aforementioned backbone oxygen atoms, is bonded only to hydrogen atoms and/or R groups as defined in Formulae 1, 2, 3 and 4. By attaching only hydrogen and/or R groups directly to backbone silicon atoms in the polymer, unwanted chain lengthening and cross-linking is avoided. Consequently, the shelf life of organohydridosiloxane resin solutions in accordance with the present invention is enhanced as compared to previously known organosiloxane resins. Furthermore, since silicon-carbon bonds are less reactive than silicon hydrogen bonds, the shelf life of the organohydridosiloxane resin solutions in accordance with the present invention is enhanced as compared to previously known hydridosiloxane resins.

In some embodiments, the polymer backbone conformation is a cage configuration. Accordingly, there are only very low levels or reactive terminal moieties in the polymer resin of this invention. This also ensures that no unwanted chain lengthening polymerization will occur in solution, resulting in an extended shelf life. Each silicon atom of the polymer is bonded to at least three oxygen atoms. Moieties bonded to the polymer backbone include hydrogen and organic moieties.

The organic moiety of the organotrichlorosilane monomer is alkyl or aryl and includes, but is not limited to, methyl, ethyl; linear and branched propyl, butyl, pettyl hexyl; and cyclic compounds such as cyclohexyl and phenyl. In some embodiments of the present invention, more than two of the aforementioned staring materials are employed.

In accordance with the method of this invention, synthesis of the organohydridosiloxane composition of this invention includes a dual phase solvent system using a catalyst. In some embodiments of the present invention, the starting materials encompass trichlorosilane and an organotrichlorosilane, for example either an alkyl or an aryl substituted trichlorosilane. The relative ratios of the trichlorosilane and the organotrichlorosilane determine the mole percent carbon-containing substituents in the polymer.

In some embodiments, the method of this invention includes:

1) mixing a solution of hydridotrihalosilanes and organic-substituted trihalosilanes (e.g. trichlorosilane and alkyl or aryltrichlorosilane) to provide a mixture,
2) combining the mixture with a dual phase solvent including a non-polar solvent, and a polar solvent to provide a dual phase reaction mixture,
3) adding a solid phase catalyst to the silane/solvent reaction mixture,
4) reacting the silanes to produce organohydridosiloxanes, and
5) recovering the organohydridosiloxane from the organic portion of the dual phase solvent system.

Additional steps may include washing the recovered organohydridosiloxane to remove any unreacted monomer, and fractionating the organohydridosiloxane product to thereby classify the product according to molecular weight.

In other embodiments, the catalyst is a phase transfer catalyst including, but not limited to, tetrabutylammonium chloride, and benzyltrimethylammonium chloride. The phase transfer catalyst is introduced into the reaction mixture and the reaction is allowed to proceed to the desired degree of polymerization.

In accordance with one aspect of the method of this invention, a dual phase solvent system includes a continuous phase non-polar solvent and a polar solvent. The non-polar solvent includes, but is not limited to, any suitable alkyl or aryl compounds or a mixture of any or all such suitable compounds, the operational definition of "suitable" in the present context includes the functional characteristics of:

1) solubilizing the monomeric silicon compounds,
2) solubilizing the resin product,
3) stability of the resin product in the solvent, and
4) insolubility of unwanted reaction products.

Exemplary solvents include, but are not limited to, pentane, hexane, heptane, cyclohexane, benzene, toluene, xylene, halogenated solvents such as carbon tetrachloride, and mixtures thereof.

The second solvent phase is a polar phase, immiscible with the organic, non-polar solvent phase, and includes water, alcohols, and alcohol and water mixtures. It is thought that alcohol solubilizes reactive intermediates that are not yet soluble in the non-polar phase and would ordinarily be unstable in a substantially aqueous phase. The amount of alcohol present is, however, not so high as to significantly dissolve product polymers having molecular weights greater than about 400 AMUs.

Alcohols and other polar solvents suitable for use in the polar phase include, but are not limited to, water, methanol, ethanol, isopropanol, glycerol, diethyl ether, tetrahydrofuran, diglyme and mixtures thereof. In one embodiment, the polar solvent includes a water/alcohol mixture wherein the water is present in an amount sufficient to preferentially solubilize ionic impurities not soluble in alcohol, and/or preclude solvent extraction of product compounds that might otherwise be soluble in alcohol. The polar solvent phase advantageously retains the hydrochloric acid (HCl) condensation product and any metal salt or other ionic contaminants, that may be present. Since any ionic contaminants are retained in the polar solvent phase, the organohydridosiloxane product of this invention is of high purity and contains essentially no metal contaminants.

In accordance with another aspect of the method of the present invention, in one embodiment, a solid phase catalyst, such as Amberjet 4200, or Amberlite I-6766 ion exchange resin (both available from Rohm and Hass Company, Philadelphia, Pa.), surface catalyzes the polymerization of the trihalosilane and organo-trihalosilane monomers into the composition of this invention. Amberjet 4200 is a basic anion exchange resin based on the chloride ion. Amberlite I-6766 is a also a basic anion exchange resin. By way of explanation, and not by way of limitation, it is thought polymer chain propagation occurs on the catalyst surface by hydrolysis of the Si—Cl bond of the monomer to Si—OH, followed by condensation with another Si—OH to provide an Si—O—Si bond, thereby extending the polymer chain. In other embodiments, polymerization is catalyzed with a phase transfer catalyst such as tetrabutylammonium chloride.

In embodiments of the present invention, the amount of organotrichlorosilane monomer present is an amount sufficient to provide an as-cured dielectric film having an organic content of less than about 40 mole percent carbon containing substituents. Such dielectric films formed in accordance with the present invention advantageously provide low dielectric constants, typically less than 3.0. In some embodiments, particularly alkylhydridosiloxane embodiments, the carbon-containing substituent content is a function of the mole percent alkyl- or aryltrihalosilane.

Additionally, dielectric films in accordance with the organohydridosiloxane composition of this invention exhibit thermal stability permitting cure temperatures up to about 450° centigrade.

This invention describes a new class of organohydridosiloxane resins having less than about 40 mole percent carbon-containing substituents. These new resins have improved stability giving longer shelf-life in solution. They also have much lower dielectric constants that are more stable after high temperature treatment than resins with no organic content.

DETAILED DESCRIPTION

While the invention is described hereinbelow with reference to certain embodiments, it is understood that these embodiments are presented by way of example and not by way of limitation. The intent of the following detailed description is to cover all modifications, alternatives and equivalents as may fall within the spirit and scope of the invention. For example, it is understood that although the examples use a chlorinated silane monomer, other monomers such as trifluorosilane, tribromosilane, organo-trifluorosilane, and organo-tribromosilane may be used. It is also understood that although an ethanol/water solution is typically used as the polar solvent, other alcohols and alcohol/water solutions may also be used.

Experimental Methods

The following characteristics encompass non-limiting measurements that illustrate the properties of the organohydridosiloxane polymer resins and thin films of the present invention. The methods used in measuring the various characteristics of the organohydridosiloxane resin and polymer films are as follows:

1) Film Thickness (Å): Film thickness is measured using a calibrated Nanospec® AFT-Y CTS-102 model 010-180 Film Thickness Measurement System available from Nanometrics, Co. An average of measurements at five locations on a wafer are reported as the film thickness for each sample.

2) Molecular Weight ("MW"): Molecular weight is determined using a gel phase chromatography system from Waters Corporation, Milford, MA, equipped with a Waters 510 pump, Waters 410 differential refractometer and a Waters 717 autosampler. As is the customary practice in the field of silicon polymers, weight average molecular weight is reported. The procedure used is as set forth by S. Rosen in "Fundamental Principles of Polymeric Materials, pages 53–81, (2nd Ed. 1993) and incorporated herein by reference.

3) Dielectric Constant: Dielectric constant is determined using the capacitance-voltage ("CV") measurement technique and employs a Hewlett-Packard Model 4061A semiconductor measurement system at a frequency of 1 MHz. This test procedure employs a metal-insulator-metal (MIM) structure with the thickness of each layer ranging from about 0.3 to 1 micron ($\mu$m).

Method of Making and Examples

The method of making the compositions of the present invention include, generally, adding a mixture of the organotrihalosilane and hydridotrihalosilane (e.g. trichlorosilane and methyl trichlorosilane) to a mixture of catalyst, nonpolar solvent, and polar solvent to form a reaction mixture. The polymerization reaction is allowed to proceed. Upon completion of the polymerization reaction, the reaction mixture is filtered, the polar solvent is separated, and the solution is dried and then evaporated to leave a white solid. This solid may then be slurried in hydrocarbon solvent to remove monomer, and finally evaporated to leave the desired product.

The Mw of the product produced can be varied between 400 and 200,000 AMU depending on the reaction conditions. We have found that materials with molecular weights of 10,000 AMU, 20,000 AMU, 40,000 AMU and 60,000 AMU all have good coating properties.

In one embodiment, the organohydridosiloxane is formulated in a suitable solvent for use as a spin-on-dielectric polymer.

EXAMPLES

The folowing examples describe the synthesis of the various organohydridosiloxane compositions of the present invention. Physical characteristics of the variously formed compositions were compared to hydridosiloxane control samples having no organic content. The control hydridosiloxane samples were prepared according to the following method:

Control

Hydridosiloxane Polymer for Dielectric Constant Measurement

A 6L jacketed reactor equipped with a nitrogen inlet, dry ice condenser and a mechanical stirrer is charged with 5500 ml hexanes 440 ml ethanol, 142 ml water and 330 g Amberjet 4200 catalyst. This mixture is equilibrated for 0.5 hr with stirring at 25° C. Trichlorosilane (380 g, 2.80 mol) is added to the reactor using a peristaltic pump over a period of 55 minutes. Upon completion of the silane addition, hexane is pumped through the lines for 10 minutes. The reaction is stirred for 100 min, the ethanol/H2O layer is removed then the hexane solution is filtered through a 3 micron filter followed by a 1 micron filter. The filtered solution is dried by flowing through a column of 4 Å molecular sieves (400 g) for 2.5 h and then filtered through a 0.05 $\mu$m filter. The hexanes are removed using a rotary evaporator to give a white solid product (131 g). Mw was measured by GPC as 21035 AMU with a polydispersity of 7.39. (Notebook # GD1.077 Nov. 13, 1996. )

Example 1 and Example 2 describe the synthesis of methyl-hydridosiloxane, and in particular, clearly illustrates how the percent carbon incorporated into the product resin may be controlled by adjusting the initial mole percent of organic-substituted monomer. By adjusting the ratio of the relative amounts of starting monomers, the mole percent of carbon-containing substituents in the product resin is controlled. It is understood by one skilled in the art that the same means for controlling percent carbon (adjusting the mole ratio of the monomer starting materials) may be used for other organohydridosiloxane species such as cycloalkyl-substituted organohydridosiloxanes, and aryl-substituted organohydridosiloxanes.

Varying Molar Amounts of Methyl Substituents Example 1 through Example 12 describe the synyphesis of various methylhydridosiloxanes by varying the moles percent methyltrichlorosilane as a starting material. Examples 1–4, 6–12 used a solid phase catalyst in the reaction system, whereas Example 5 used a phase transfer catalyst.

Example 13 through Example 21 describe the formation of organohydridosiloxane resins using varying mole amounts of varying organic substituents.

Example 1

Preparation of 25 Mole Percent Methylhydridosiloxane

A 250 mL Morton flask was fitted with a condenser and a stirrer connected to an Arrow 1750 motor. The flask was purged with $N_2$ and during the reaction $N_2$ was blown across the top of the condenser into an NaOH scrubber. 15 g of Amberlite I-6766 ion exchange resin catalyst, 20 mL of ethanol, 6.3 mL of water, and 250 mL of hexanes were added to the flask, and stirring was started. 13 mL(0.129 mol.) of trichlorosilane and 5 mL(0.043 mol.) of methyltrichlorosilane (24.9 mol % methyltrichlorosilane) were combined together in an HDPE bottle. This mixture of silanes was added to the Morton flask through a peristaltic pump at a rate of 0.6 mL/min. After addition was completed, stirring was continued for 90 min. Solution was filtered by vacuum through a Whatman #4 filter in a buchner funnel. Solution was added to a separatory funnel and the lower, aqueous layer was discarded. The upper layer was dried over 40 g of 3 Å molecular sieves for 2.5 hr. Solution was filtered by vacuum through a Whatman #1 filter paper in a buchner funnel. Solution was evaporated on a Buchi rotary evaporator at 60C. 5.2 g of white solid was collected. Mw was measured by GPC as 12,300 AMU with a polydispersity of 4.35.

Example 2

Preparation of 20 Mole Percent Methylhydridosiloxane

A 2L Morton flask was fitted with a dry-ice condenser and a stirrer connected to an Arrow 1750 motor. Reactor was placed in a water bath set at 25C. The flask was purged with $N_2$ and during the reaction N2 was blown across the top of the condenser into an NaOH scrubber. 60.25 g of Amberjet 4200(Cl) ion exchange resin catalyst, 80 mL of ethanol, 25 mL of water, and 1000 mL of hexanes were added to the flask, and stirring was started. 58 mL(0.575 mol.) of trichlorosilane and 17 mL(0.145 mol.) of methyltrichlorosilane (20.1 mol % methyltrichlorosilane) were combined together in an FEP bottle. This mixture of silanes was added to the Morton flask by peristaltic pump through a ¼" Teflon tube at a set rate of 8.0 RPM. Calculated addition rate was 2.5 mL/min. After addition was completed, stirring was continued for 185 min. Solution was filtered by vacuum through a Whatman #4 filter in a buchner funnel. Solution was added to a separatory funnel and the lower, aqueous layer was discarded. The upper layer was dried over 171 g of 4 Å molecular sieves for 3.5 hr. Solution was filtered by vacuum through a Whatman #2 filter paper in a buchner funnel. Solution was evaporated on a Buchi rotary evaporator at 60C. Yield was 25.2 g of white solid. Mw was measured by GPC as 26,014 AMU with a polydispersity of 13.68.

Example 3
Preparation of 20 Mole Percent Methylhydridosiloxane

A 2L jacketed reactor was fitted with a dry-ice condenser, a stirrer connected to an Arrow 6000 motor, and a glass dip tube. Reactor was connected to a recirculating water bath set at 25C. The flask was purged with $N_2$ and during the reaction $N_2$ was blown across the top of the condenser into an NaOH scrubber. 103.9 g of Amberjet 4200(Cl) ion exchange resin catalyst, 140 mL of ethanol, 45 mL of water, and 1750 mL of hexanes were added to the reactor, and stirring was started. 100 mL(0.991 mol.) of trichlorosilane and 29 mL(0.248 mol.) of methyltrichlorosilane (20 mol % methyltrichlorosilane) were combined together in an FEP bottle. This mixture of silanes was added to the reactor by peristaltic pump through a ¼" Teflon tube at a set rate of 14.3 RPM. Calculated addition rate was 3.15 mL/min. After addition was completed, stirring was continued for 66 min. Solution was filtered by vacuum through a Whatman #4 filter in a buchner funnel. Solution was added to a separatory funnel and the lower, aqueous layer was discarded. The upper layer was dried over 299.7 g of 4 Å molecular sieves for 3 hr. Solution was filtered by vacuum through a Teflon membrane with 1 micron pores set on a glass frit. Solution was evaporated on a Buchi rotary evaporator at 60C. Yield was 53.2 g of white solid. Mw was measured by GPC as 21,040 AMU with a polydispersity of 11.07.

Example 4
Preparation of 20 Mole Percent Methylhydridosiloxane

A 2L jacketed reactor was fitted with a dry-ice condenser, a stirrer connected to an Arrow 850 motor, and a glass dip tube. Reactor was connected to a recirculating water bath set at 25C. The flask was purged with $N_2$ and during the reaction $N_2$ was blown across the top of the condenser into an NaOH scrubber. 52.65 g of Amberjet 4200(Cl) ion exchange resin catalyst, 140 mL of ethanol, 90 mL of water, and 1750 mL of hexanes were added to the reactor, and stirring was started. 200 mL(1.982 mol.) of trichlorosilane and 58 mL(0.496 mol.) of methyltrichlorosilane (20 mol % methyltrichlorosilane) were combined together in an FEP bottle. This mixture of silanes was added to the reactor by peristaltic pump through a ¼" Teflon tube at a set rate of 10.0 RPM. Calculated addition rate was 2.4 mL/min. After addition was completed, stirring was continued for 48 min. Solution was filtered by vacuum through a Whatman #1 filter in a buchner funnel. Solution was added to a separatory funnel and the lower, aqueous layer was discarded. The upper layer was dried over 300 g of 4 Å molecular sieves for 3 hr. Solution was filtered by vacuum through a Teflon membrane with 1 micron pores set on a glass frit. Solution was evaporated on a Buchi rotary evaporator at 60C. Yield was 61.82 g of white solid. Mw was measured by GPC as 16,999 AMU with a polydispersity of 17.21.

Example 5
Preparation of 20 Mole Percent Methylhydridosiloxane

A 2L jacketed reactor was fitted with a dry-ice condenser, a stirrer connected to an Arrow 850 motor, and a glass dip tube. Reactor was connected to a recirculating water bath set at 25C. The flask was purged with N2 and during the reaction N2 was blown across the top of the condenser into an NaOH scrubber. 10.0 g of 10% tetrabutylammonium chloride catalyst in water, 380 mL of ethanol, 66 mL of water, and 1500 mL of hexanes were added to the reactor, and stirring was started. 171 mL(1.694 mol.) of trichlorosilane and 50 mL(0.426 mol.) of methyltrichlorosilane (20.1 mol % methyltrichlorosilane) were combined together in an FEP bottle. This mixture of silanes was added to the reactor by peristaltic pump through a ¼" Teflon tube at a set rate of 11.5 RPM. Calculated addition rate was 2.95 mL/min. After addition was completed, stirring was continued for 130 min. Solution was added to a separatory funnel and the lower, aqueous layer was discarded. Solution was filtered by vacuum through a Whatman #1 filter in a buchner funnel. The upper layer was dried over 303.2 g of 4 Å molecular sieves for 3 hr. Solution was filtered by vacuum through a Teflon membrane with 1 micron pores set on a glass frit. Solution was evaporated on a Buchi rotary evaporator at 60C. Yield was 77.5 g of white solid. Mw was measured by GPC as 32,051 AMU with a polydispersity of 29.35.

Example 6
Preparation of 16 Mole Percent Methylhydridosiloxane

A 2L Morton flask was fitted with a dry-ice condenser and a stirrer connected to an Arrow 1750 motor. Reactor was placed in a water bath set at 25C. The flask was purged with N2 and during the reaction N2 was blown across the top of the condenser into an NaOH scrubber. 60.30 g of Amberjet 4200(Cl) ion exchange resin catalyst, 80 mL of ethanol, 25 mL of water, and 1000 mL of hexanes were added to the flask, and stirring was started. 61 mL of trichlorosilane (0.604 mol.) and 13.5 mL(0.115 mol.) of methyltrichlorosilane (16 mol % methyltrichlorosilane) were combined together in an FEP bottle. This mixture of silanes was added to the Morton flask by peristaltic pump through a ¼" Teflon tube at a set rate of 8.5 RPM. Calculated addition rate was 2.33 mL/min. After addition was completed, stirring was continued for 180 min. Solution was filtered by vacuum through a Whatman #4 filter in a buchner funnel. Solution was added to a separatory funnel and the lower, aqueous layer was discarded. The upper layer was dried over 170.63 g of 4 Å molecular sieves for 5.75 hr. Solution was filtered by vacuum through a Whatman #2 filter paper in a buchner funnel. Solution was evaporated on a Buchi rotary evaporator at 60C. Yield was 26.4 g of white solid. Mw was measured by GPC as 26,813 AMU with a polydispersity of 14.20.

Example 7
Preparation of 12 Mole Percent Methylhydridosiloxane

A 2L Morton flask was fitted with a dry-ice condenser and a stirrer connected to an Arrow 1750 motor. Reactor was placed in a water bath set at 25C. The flask was purged with N2 and during the reaction N2 was blown across the top of the condenser into an NaOH scrubber. 60.32 g of Amberjet 4200(Cl) ion exchange resin catalyst, 80 mL of ethanol, 25 mL of water, and 1000 mL of hexanes were added to the flask, and stirring was started. 63 mL(0.624 mol.) of trichlorosilane and 10 mL(0.085 mol.) of methyltrichlorosilane (12 mol % methyltrichlorosilane) were combined together in an FEP bottle. This mixture of silanes was added to the Morton flask by peristaltic pump through a ¼" Teflon tube at a set rate of 8.5 RPM. Calculated addition rate was 2.45 mL/min. After addition was completed, stirring was continued for 60 min. Solution was filtered by vacuum through a Whatman #4 filter in a buchner funnel. Solution was added to a separatory funnel and the lower, aqueous layer was discarded. The upper layer was dried over 171.63 g of 4 Å molecular sieves for 7 hr. Solution was filtered by vacuum through a Whatman #2 filter paper in a buchner funnel. Solution was evaporated on a Buchi rotary evaporator at 60C. Yield was 22.7 g of white solid. Mw was measured by GPC as 24,089 AMU with a polydispersity of 15.84.

Example 8
Preparation of 10 Mole Percent Methylhydridosiloxane

A 500 mL Morton flask was fitted with a condenser and a stirrer connected to an Arrow 850 motor. The flask was purged with N2 and during the reaction N2 was blown across the top of the condenser into an NaOH scrubber. 18.03 g of Amberjet 4200 (Cl) ion exchange resin catalyst, 20 mL of ethanol, 6.3 mL of water, and 250 mL of hexanes were added to the flask, and stirring was started. 16 mL(0.159 mol.) of trichlorosilane and 2 mL(0.017 mol.) of methyltrichlorosilane (9.7 mol % methyltrichlorosilane) were combined together in an HDPE bottle. This mixture of silanes was added to the Morton flask through a peristaltic pump at a rate of 0.6 mL/min. After addition was completed, stirring was continued for 98 min. Solution was filtered by vacuum through a Whatman #4 filter in a buchner funnel. Solution was added to a separatory funnel and the lower, aqueous layer was discarded. The upper layer was dried over 30.04 g of 4 Å molecular sieves for 3.25 hr. Solution was filtered by vacuum through a Whatman #1 filter paper in a buchner funnel. Solution was evaporated on a Buchi rotary evaporator at 60C. 5.9 g of white solid was collected. Mw was measured by GPC as 15,844 AMU with a polydispersity of 4.57.

Example 9
Preparation of 8 Mole Percent Methylhydridosiloxane

A 2L Morton flask was fitted with a dry-ice condenser and a stirrer connected to an Arrow 1750 motor. Reactor was placed in a water bath set at 25C. The flask was purged with N2 and during the reaction N2 was blown across the top of the condenser into an NaOH scrubber. 60.27 g of Amberjet 4200(Cl) ion exchange resin catalyst, 80 mL of ethanol, 25 mL of water, and 1000 mL of hexanes were added to the flask, and stirring was started. 66 mL(0.654 mol.) of trichlorosilane and 7 mL(0.060 mol.) of methyltrichlorosilane (8.35 mol % methyltrichlorosilane) were combined together in an FEP bottle. This mixture of silanes was added to the Morton flask by peristaltic pump through a ¼" Teflon tube at a set rate of 8.5 RPM. Calculated addition rate was 2.15 mL/min. After addition was completed, stirring was continued for 120 min. Solution was filtered by vacuum through a Whatman #4 filter in a buchner funnel. Solution was added to a separatory funnel and the lower, aqueous layer was discarded. The upper layer was dried over 170.25 g of 4 Å molecular sieves for 3.25 hr. Solution was filtered by vacuum through a Whatman #2 filter paper in a buchner funnel. Solution was evaporated on a Buchi rotary evaporator at 60C. Yield was 24.5 g of white solid. Mw was measured by GPC as 23,066 AMU with a polydispersity of 15.50.

Example 10
Preparation of 5 Mole Percent Methylhydridosiloxane

A 500 mL Morton flask was fitted with a condenser and a stirrer connected to an Arrow 850 motor. The flask was purged with N2 and during the reaction N2 was blown across the top of the condenser into an NaOH scrubber. 18.02 g of Amberjet 4200 (Cl) ion exchange resin catalyst, 20 mL of ethanol, 6.3 mL Of water, and 250 mL Of hexanes were added to the flask, and stirring was started. 17 mL(0.168 mol.) of trichlorosilane and 1 mL(0.009 mol.) of methyltrichlorosilane (5.1 mol % methyltrichlorosilane) were combined together in an HDPE bottle. This mixture of silanes was added to the Morton flask through a peristaltic pump at a rate of 0.6 mL/min. After addition was completed, stirring was continued for 90 min. Solution was filtered by vacuum through a Whatman #4 filter in a buchner funnel. Solution was added to a separatory funnel and the lower, aqueous layer was discarded. The upper layer was dried over 30.25 g of 4 Å molecular sieves for 2.5 hr. Solution was filtered by vacuum through a Whatman #4 filter paper in a buchner funnel. Solution was evaporated on a Buchi rotary evaporator at 60C. 6.6 g of white solid was collected. Mw was measured by GPC as 18,947 AMU with a polydispersity of 4.60.

Example 11
Preparation of 4 Mole Percent Methylhydridosiloxane

A 2L Morton flask was fitted with a dry-ice condenser and a stirrer connected to an Arrow 1750 motor. Reactor was placed in a water bath set at 25C. The flask was purged with N2 and during the reaction N2 was blown across the top of the condenser into an NaOH scrubber. 60.40 g of Amberjet 4200(Cl) ion exchange resin catalyst, 8OmL of ethanol, 25 mL of water, and 1000 mL of hexanes were added to the flask, and stirring was started. 70 mL(0.694 mol.) of trichlorosilane and 3.5 mL(0.030 mol.) of methyltrichlorosilane (4.1 mol % methyltrichlorosilane) were combined together in an FEP bottle. This mixture of silanes was added to the Morton flask by peristaltic pump through a ¼" Teflon tube at a set rate of 10.0 RPM. Calculated addition rate was 2.45 mL/min. After addition was completed, stirring was continued for 60 min. Solution was filtered by vacuum through a Whatman #4 filter in a buchner funnel. Solution was added to a separatory funnel and the lower, aqueous layer was discarded. The upper layer was dried over 171.53 g of 4 Å molecular sieves for 3 hr. Solution was filtered by vacuum through a Whatman #1 filter paper in a buchner funnel. Solution was evaporated on a Buchi rotary evaporator at 60C. Yield was 25.1 g of white solid. Mw was measured by GPC as 22,094 AMU with a polydispersity of 8.77.

Example 12
Preparation of 2 Mole Percent Methylhydridosiloxane

A 2L jacketed reactor was fitted with a condenser and a stirrer connected to an Arrow 850 motor. The flask was purged with N2 and during the reaction N2 was blown across the top of the condenser into an NaOH scrubber. 105.07 g of Amberjet 4200 (Cl) ion exchange resin catalyst, 140 mL of ethanol, 45 mL of water, and 1750 mL of hexanes were added to the flask, and stirring was started. 123 mL(1.219 mol.) of trichlorosilane and 3 mL(0.026 mol.) of methyltrichlorosilane (2.1 mol % methyltrichlorosilane) were combined together. This mixture of silanes was added to the Morton flask through a peristaltic pump at a rate of 3.2 mL/min. After addition was completed, stirring was continued for 25 min. Solution was filtered by vacuum through a Whatman #4 filter in a buchner funnel. Solution was added to a separatory funnel and the lower, aqueous layer was discarded. The upper layer was dried over 354.3 g of 4 Å molecular sieves for 3 hr. Solution was filtered by vacuum through a Whatman #2 filter paper in a buchner funnel. Solution was evaporated on a Buchi rotary evaporator at 60C. 42.00 g of white solid was collected. Mw was measured by GPC as 21,312 AMU with a polydispersity of 4.80.

Example 13
Preparation of 20 Mole Percent Ethylhydridosiloxane

A 1L jacketed reactor was fitted with a dry-ice condenser, a stirrer connected to an Arrow 850 motor, and a glass dip tube. Reactor was connected to a recirculating water bath set at 25C. The flask was purged with N2 and during the reaction N2 was blown across the top of the condenser into an NaOH scrubber. 60.6 g of Amberjet 4200(Cl) ion exchange resin catalyst, 80 mL of ethanol, 25 mL of water, and 1000 mL of hexanes were added to the reactor, and stirring was started. 58 mL(0.575 mol.) of trichlorosilane and 19 mL(0.145 mol.) of ethyltrichlorosilane (20.1 mol % ethyltrichlorosilane) were combined together in an FEP bottle. This mixture of silanes was added to the reactor by peristaltic pump through a ¼" Teflon tube at a set rate of 11.2 RPM. Calculated addition rate was 2.2 mL/min. After addition was completed, stirring was continued for 120 min. Solution was filtered by vacuum through a Whatman #4 filter in a buchner funnel. Solution was added to a separatory funnel and the lower, aqueous layer was discarded. The upper layer was dried over 171 g of 4 Å molecular sieves for 3 hr. Solution was filtered by vacuum through a Teflon membrane with 1 micron pores set on a glass frit. Solution was evaporated on a Buchi rotary evaporator at 60C. Yield was 31.0 g of white solid. Mw was measured by GPC as 23,987 AMU with a polydispersity of 10.27.

Example 14
Preparation of 20 Mole Percent Propylhydridosiloxane

A 2L jacketed reactor was fitted with a dry-ice condenser, a stirrer connected to an Arrow 6000 motor, and a glass dip tube. Reactor was connected to a recirculating water bath set at 25C. The flask was purged with N2 and during the reaction N2 was blown across the top of the condenser into an NaOH scrubber. 59.5 g of Amberjet 4200(Cl) ion exchange resin catalyst, 80 mL OF ethanol, 25 mL of water, and 1000 mL Of hexanes were added to the reactor, and stirring was started. 58 mL(0.575 mol.) of trichlorosilane and 21.5 mL(0.145 mol.) of propyltrichlorosilane (20.1 mol % propyltrichlorosilane) were combined together in an FEP bottle. This mixture of silanes was added to the reactor by peristaltic pump through a ¼" Teflon tube at a set rate of 11.0 RPM. Calculated addition rate was 2.3 mL/min. After addition was completed, stirring was continued for 120 min. Solution was filtered by vacuum through a Whatman #4 filter in a buchner funnel. Solution was added to a separatory funnel and the lower, aqueous layer was discarded. The upper layer was dried over 170.5 g of 4 Å molecular sieves for 3.5 hr. Solution was filtered by vacuum through a Teflon membrane with 1 micron pores set on a glass frit. Solution was evaporated on a Buchi rotary evaporator at 60C. Yield was 35.8 g of white solid. Mw was measured by GPC as 17,840 AMU with a polydispersity of 7.49.

Example 15
Preparation of 20 Mole Percent n-Butylhydridosiloxane

A 1L jacketed reactor was fitted with a dry-ice condenser, a stirrer connected to an Arrow 6000 motor, and a glass dip tube. Reactor was connected to a recirculating water bath set at 25C. The flask was purged with N2 and during the reaction N2 was blown across the top of the condenser into an NaOH scrubber. 59.9 g of Amberjet 4200(Cl) ion exchange resin catalyst, 80 mL OF ethanol, 25 mL of water, and 1000 mL Of hexanes were added to the reactor, and stirring was started. 58 mL(0.575 mol.) of trichlorosilane and 24 mL(0.145 mol.) of n-butyltrichlorosilane (20.2 mol % n-butyltrichlorosilane) were combined together in an FEP bottle. This mixture of silanes was added to the reactor by peristaltic pump through a ¼" Teflon tube at a set rate of 7.0 RPM. Calculated addition rate was 2.3 mL/min. After addition was completed, stirring was continued for 120 min. Solution was filtered by vacuum through a Whatman #4 filter in a buchner funnel. Solution was added to a separatory funnel and the lower, aqueous layer was discarded. The upper layer was dried over 171.6 g of 4 Å molecular sieves for 3 hr. Solution was filtered by vacuum through a Teflon membrane with 1 micron pores set on a glass frit. Solution was evaporated on a Buchi rotary evaporator at 60C. Yield was 38.1 g of clear, viscous liquid. Mw was measured by GPC as 16,022 AMU with a polydispersity of 6.45.

Example 16
Preparation of 20 Mole Percent Cyclohexylhydridosiloxane

A 2L jacketed reactor was fitted with a dry-ice condenser, a stirrer connected to an Arrow 6000 motor, and a glass dip tube. Reactor was connected to a recirculating water bath set at 25C. The flask was purged with N2 and during the reaction N2 was blown across the top of the condenser into an NaOH scrubber. 60.2 g of Amberjet 4200(Cl) ion exchange resin catalyst, 80 mL OF ethanol, 25 mL of water, and 1000 mL of hexanes were added to the reactor, and stirring was started. 59 mL(0.585 mol.) of trichlorosilane and 26 mL(0.147 mol.) of cyclohexyltrichlorosilane (20.1 mol % cyclohexyltrichlorosilane) were combined together in an FEP bottle. This mixture of silanes was added to the reactor by peristaltic pump through a ¼" Teflon tube at a set rate of 11.0 RPM. Calculated addition rate was 2.7 mL/min. After addition was completed, stirring was continued for 120 min. Solution was filtered by vacuum through a Whatman #4 filter in a buchner funnel. Solution was added to a separatory funnel and the lower, aqueous layer was discarded. The upper layer was dried over 172.1 g of 4 Å molecular sieves for 5 hr. Solution was filtered by vacuum through a Teflon membrane with 1 micron pores set on a glass frit. Solution was evaporated on a Buchi rotary evaporator at 60C. Yield was 42.33 g of white solid. Mw was measured by GPC as 12,721 AMU with a polydispersity of 7.18.

Example 17
Preparation of 20 Mole Percent Phenylhydridosiloxane

A 1L jacketed reactor was fitted with a dry-ice condenser, a stirrer connected to an Arrow 6000 motor, and a glass dip tube. Reactor was connected to a recirculating water bath set at 25C. The flask was purged with N2 and during the reaction N2 was blown across the top of the condenser into an NaOH scrubber. 60.2 g of Amberjet 4200(Cl) ion exchange resin catalyst, 80 mL OF ethanol, 25 mL of water, and 1000ML of hexanes were added to the reactor, and stirring was started. 58 mL(0.575 mol.) of trichlorosilane and 23 mL(0.144 mol.) of phenyltrichlorosilane (20 mol % phenyltrichlorosilane) were combined together in an FEP bottle. This mixture of silanes was added to the reactor by peristaltic pump through a ¼" Teflon tube at a set rate of 7.0 RPM. Calculated addition rate was 2.03 mL/min. After addition was completed, stirring was continued for 120 min. Solution was filtered by vacuum twice through Whatman #4 filters in buchner funnels. Solution was added to a separatory funnel and the lower, aqueous layer was discarded. The upper layer was dried over 171.3 g of 4 Å molecular sieves overnight. Solution was filtered by vacuum through a Teflon membrane with 20 micron pores set on a glass frit. Solution was then further filtered by vacuum through a Teflon membrane with 5 micron pores set on a glass frit. Solution was evaporated on a Buchi rotary evaporator at 60C. Yield was 22.2 g of white solid. Mw was measured by GPC as 77,827 AMU with a polydispersity of 37.92.

Discussion—Example 3—Example 17
Dielectric Constant Measurements and Cure Temperature Effects Each of the organohydrogensiloxane resins of Example 3 through Example 17 were formed into a coating solution and spin-coated onto a silicon substrate to a nominal thickness of 4000 Å. The wafers were cured at various temperatures as indicated in Table I below, and the dielectric constants for each as-cured polymer film was measured. The dielectric constants of the cured polymer films of the organohydrogensiloxanes of Example 3 through Example 17, as well as the measured dielectric constants for non-organic substituted hydrogensiloxane cured films (Controls #1–#4) is reported in Table I below. The hydridosiloxane resins used in the films reported as Controls #1–#4 were prepared in the manner described above.

TABLE I

Dielectric constant measurements.

| Mol % organic substituent used to make resin | Cure Temperature. | Dielectric Constant (at 1 MHz) |
|---|---|---|
| Control #1 - No carbon hydridosiloxane | 380° C. | 3.06 |
| 20% Methyl (Example 3) | 380° C. | 2.90 |
| 20% Methyl (Example 4) | 380° C. | 2.79 |
| Control #2 - No carbon hydridosiloxane | 390° C. | 3.22 |
| 4% Methyl (Example 11) | 390° C. | 3.09 |
| 8% Methyl (Example 9) | 390° C. | 2.93 |
| 12% Methyl (Example 7) | 390° C. | 2.88 |
| 16% Methyl (Example 6) | 390° C. | 2.87 |
| 20% Methyl (Example 2) | 390° C. | 2.85 |
| Control #3 - No carbon hydridosiloxane | 400° C. | 3.27 |
| 20% Methyl (Example 3) | 400° C. | 3.04 |
| 20% Ethyl (Example 13) | 400° C. | 2.97 |
| 20% Propyl (Example 14) | 400° C. | 2.86 |
| 20% n-Butyl (Example 15) | 400° C. | 2.86 |
| 20% cyclohexyl (Example 16) | 400° C. | 3.03 |
| 20% Phenyl (Example 17) | 400° C. | 2.82 |
| Control #4 - No carbon hydridosiloxane | 425° C. | 3.34 |
| 20% Methyl (Example 5) | 425° C. | 3.13 |

As can clearly be seen, the dielectric constants in all samples were approximately 3 or lower, and in all cases lower than the non-organic controls. Higher carbon number alkyl moieties and the aryl moiety appear to exhibit lower dielectric constants (i.e., <3). It is clear to one skilled in the art, in view of Table I, that the higher mole percent carbon-containing substituent polymers have lower dielectric constant values. This is particularly evident in the methylhydridosiloxanes of Example 11, 9, 7, 6, and 2, and in the phenylhydridosiloxane of Example 17.

Table I also clearly shows the effect of cure temperature on the dielectric constant of the as-cured polymer film. Control cells 1, 2, and 3 are carbon-free hydrogensiloxane resins. The reported dielectric constants of the films associated with those Control cells are significantly higher than the dielectric constants of the polymer films formed from the organohydridosiloxanes of Example 3 through Example 17. Moreover, the polymer films of the Control cells exhibit thermal instability and degradation with increasing cure temperature as indicated by the increasing dielectric constants with increasing cure temperature, ranging from 3.06 for Control #1 to 3.34 for COntrol #4; a difference of 0.28. By comparison, the organohydridosiloxane polymer films of Example 3 through Example 17 remain relatively stable with increasing cure temperature. The higher carbon number substituents seem particularly stable as evidenced by the low dielectric constants associated with Examples 14, 15, and 17.

Examples 18 through Example 20 further describe the synthesis of organohydridosiloxane resins of this invention varying the organic substituent.

Example 18
Preparation of 20 Mole Percent t-Butylhydridosiloxane

A 2L jacketed reactor was fitted with a dry-ice condenser, a stirrer connected to an Arrow 6000 motor, and a glass dip tube. Reactor was connected to a recirculating water bath set at 25C. The flask was purged with N2 and during the reaction N2 was blown across the top of the condenser into an NaOH scrubber. 60.77 g of Amberjet 4200(Cl) ion exchange resin catalyst, 80 mL OF ethanol, 25 mL of water, and 1000 ML of hexanes were added to the reactor, and stirring was started. 58 mL(0.575 mol.) of trichlorosilane and 27.84 g (0.145 mol.) of t-butyltrichlorosilane (20.2 mol % t-butyltrichlorosilane) were combined together in an FEP bottle. This mixture of silanes was added to the reactor by peristaltic pump through a ¼" Teflon tube at a set rate of 12.3 RPM. After addition was completed, stirring was continued for 120 min. Solution was filtered by vacuum through a Whatman #4 filter in a buchner funnel. Solution was added to a separatory funnel and the lower, aqueous layer was discarded. The upper layer was dried over 172.1 g of 4 Å molecular sieves for 3 hr. Solution was filtered by vacuum through a Teflon membrane with 1 micron pores set on a glass frit. Solution was evaporated on a Buchi rotary evaporator at 60C. Yield was 35.35 g of white resin. Mw was measured by GPC as 11,379 AMU with a polydispersity of 4.51.

Example 19
Preparation of 10 Mole Percent Phenylhydridosiloxane

A 1L jacketed reactor was fitted with a dry-ice condenser, a stirrer connected to an Arrow 6000 motor, and a glass dip tube. Reactor was connected to a recirculating water bath set at 25C. The flask was purged with N2 and during the reaction N2 was blown across the top of the condenser into an NaOH scrubber. 60.3 g of Amberjet 4200(Cl) ion exchange resin catalyst, 80 mL OF ethanol, 25 mL of water, and 1000 mL Of hexanes were added to the reactor, and stirring was started. 65 mL(0.644 mol.) of trichlorosilane and 11.5 mL(0.072 mol.) of phenyltrichlorosilane (10 mol % phenyltrichlorosilane) were combined together in an FEP bottle. This mixture of silanes was added to the reactor by peristaltic pump through a ¼" Teflon tube at a set rate of 10.0 RPM. Calculated addition rate was 2.55 mL/min. After addition was completed, stirring was continued for 20 min. Solution was filtered by vacuum through a Whatman #4 filter in a buchner funnels. Solution was added to a separatory funnel and the lower, aqueous layer was discarded. The upper layer was dried over 175.3 g of 4 Å molecular sieves for 4 hr. Solution was filtered by vacuum through a Teflon membrane with 1 micron pores set on a glass frit. Solution was evaporated on a Buchi rotary evaporator at 60C. Yield was 30.8 g of white solid. Mw was measured by GPC as 16,656 AMU with a polydispersity of 10.23.

Example 20
Preparation of 10 Mole Percent t-Butylhydridosiloxane

A 1L jacketed reactor was fitted with a dry-ice condenser, a stirrer connected to an Arrow 6000 motor, and a glass dip tube. Reactor was connected to a recirculating water bath set at 25C. The flask was purged with N2 and during the reaction N2 was blown across the top of the condenser into an NaOH scrubber. 61 g of Amberjet 4200(Cl) ion exchange resin catalyst, 80 mL OF ethanol, 25 mL of water, and 1000 mL Of hexanes were added to the reactor, and stirring was started. 65 mL(0.644 mol.) of trichlorosilane and 13.69 g (0.071 mol.) of t-butyltrichlorosilane (10 mol % t-butyltrichlorosilane) were combined together in an FEP bottle. This mixture of silanes was added to the reactor by peristaltic pump through a ¼" Teflon tube at a set rate of 11.0 RPM. After addition was completed, stirring was continued for 120 min. Solution was filtered by vacuum through a Whatman #1 filter in a buchner funnel. Solution was added to a separatory funnel and the lower, aqueous layer was discarded. The upper layer was dried over 173 g of 4 Å molecular sieves for 4 hr. Solution was filtered by vacuum through a Teflon membrane with 1 micron pores set on a glass frit. Solution was evaporated on a Buchi rotary evaporator at 60C. Yield was 30.75 g of white solid. Mw was measured by GPC as 12,112 AMU with a polydispersity of 10.12.

Example 21
Preparation of 20 Mole Percent 3,3,3-Trifluoropropylhydridosiloxane

A 1L jacketed reactor was fitted with a dry-ice condenser, a stirrer connected to an Arrow 6000 motor, and a glass dip tube. Reactor was connected to a recirculating water bath set at 25C. The flask was purged with N2 and during the reaction N2 was blown across the top of the condenser into an NaOH scrubber. 60.23 g of Amberjet 4200(Cl) ion exchange resin catalyst, 80 mL OF ethanol, 25 mL of water, and 1000 mL Of hexanes were added to the reactor, and stirring was started. 58 mL(0.575 mol.) of trichlorosilane and 24 mL(0.145 mol.) of 3,3,3-Trifluoropropyltrichlorosilane (20.1 mol % 3,3,3-Trifluoropropyltrichlorosilane) were combined together in an FEP bottle. This mixture of silanes was added to the reactor by peristaltic pump through a ¼" Teflon tube at a set rate of 7.0 RPM. Calculated addition rate was 2.05 mL/min. After addition was completed, stirring was continued for 120 min. Solution was filtered by vacuum twice through Whatman #4 filters in buchner funnels. Solution was added to a separatory funnel, but no aqueous layer formed. Solution was dried over 171.64 g of 4 Å molecular sieves for 4 hr. Solution was filtered by vacuum through a Teflon membrane with 5 micron pores set on a glass frit. Solution was evaporated on a Buchi rotary evaporator at 60C. Yield was 6.85 g of white resin. Mw was measured by GPC as 27,817 AMU, with a polydispersity of 20.64.

In view of the foregoing, it will be understood that the present invention provides a organohydridosiloxane resin composition having a caged conformation polymer backbone, and therefore essentialy no reactive terminal moieties, and up to a 40 mole percent of a carbon-containing substituent. The hydrogen and organic moieties were bonded directly to a silicon atom in the polymer backbone thereby precluding hydrolyzation of the organic moieties, and subsequent chain extension via condensation of the hydroxyl moieties. It is evident that the absence of hydroxyl and alkoxy moieties and the absence of terminal silicon renders the organohydridosiloxanes of this invention very stable in solution, resulting in an extended shelf life. It is also evident that the absence of silanol moieties reduces the dielectric constant of the composition of this invention to a value typically less than three. It is further evident that the presence of organic side groups substantially increases the thermal stability of the composition to a temperature of about 450° C. thereby permitting higher cure temperatures.

The present invention includes a novel process for making the organohydridosiloxane polymer composition of this invention and includes a dual phase solvent system, a non-participating catalyst, and trihalosilane and organotrihalosilane co-monomers. It is evident that the amount of carbon in the composition is controllable by the relative ratios of the co-monomers. It is also evident that the complete absence of a metal catalyst and the presence of the polar solvent phase renders the product composition of the process extremely pure and free of metal salt, and other ionic contaminants.

What is claimed is:

1. A method for making an organohydridosiloxane, comprising in any operative order:

a) charging a reaction vessel with a dual phase solvent including a non-polar solvent and a polar solvent;

b) adding a monomer solution comprising organotrihalosilanes and hydridotrihalosilanes to the dual phase solvent to provide a reaction mixture;

c) introducing a catalyst to the reaction mixture; and d) reacting the organotrihalosilanes and hydridotrihalosilanes to form an organohydridosiloxane resin product.

2. A method for making an organohydridosiloxane as in claim 1 further comprising recovering the organohydridosiloxane resin from the reaction mixture.

3. A method for making an organohydridosiloxane as in claim 1 wherein said catalyst is selected from a solid phase catalyst and a phase-transfer catalyst solution.

4. A method for making an organohydridosiloxane as in claim 3 wherein said catalyst is selected from tetrabutylammonium chloride, benzyltrimethylammonium chloride, and a solid phase catalyst which surface catalyzes the polymerization of the trihalosilane and organotrihalosilane monomers.

5. A method for making an organohydridosiloxane as in claim 1 wherein said catalyst is a solid phase catalyst which surface catalyzes the polymerization of the trihalosilane and organotrihalosilane monomers.

6. A method for making an organohydridosiloxane as in claim 1 wherein said catalyst is tetrabutylammonium chloride.

7. A method for making an organohydridosiloxane as in claim 1 wherein the hydridotrihalosilane is trichlorosilane, and the organo-trihalosilane is selected from the group consisting of methyltrichlorosilane, ethyltrichlorosilane, n-butyltrichlorosilane, t-butyltrichlorosilane, n-phenyltrichlorosilane, n-hexyltrichlorosilane, cyclohexyltrichlorosilane, phenyltrichlorosilane, 3,3,3-trifluoropropyltrichlorosilane, and mixtures thereof.

8. A method for making an organohydridosiloxane as in claim 7, wherein said catalyst is a solid phase catalyst which surface catalyzes the polymerization of the trihalosilane and organotrihalosilane monomers.

9. A method for making an organohydridosiloxane as in claim 1 wherein said non-polar solvent is selected from the group consisting of pentane, hexane, heptane, cyclohexane, benzene, toluene, xylene, and carbon tetrachloride, and mixture, thereof.

10. A method for making an organohydridosiloxane as in claim 1 wherein said polar solvent is selected from the group consisting of water, methanol, ethanol, isopropanol, glycerol, diethyl ether, tetrahydrofuran, diglyme, and mixtures thereof.

11. A method for making an organohydridosiloxane as in claim 10 wherein the non-polar solvent is hexane, and the polar solvent is a water and ethanol mixture.

12. An organohydridosiloxane composition produced by the process, comprising in any operative order:
   a) charging a reaction vessel with a dual phase solvent including a non-polar solvent, and a polar solvent, said polar solvent comprising alcohol and water;
   b) adding a monomer solution comprising organotrihalosilanes and hydridotrihalosilanes to provide a reaction mixture, wherein said monomer solution is between about 0.1 and about 40 mole percent organotrihalosilane;
   c) introducing a catalyst to the reaction mixture; and
   d) reacting the organotrihalosilanes and hydridotrihalosilanes to form an organohydridosiloxane resin.

13. An organohydridosiloxane composition produced by the process of claim 12, the process further comprising recovering the organohydridosiloxane from the reaction mixture.

14. An organohydridosiloxane composition produced by the process of claim 12 wherein said catalyst is selected from a solid phase catalyst and a liquid phase-transfer catalyst.

15. An organohydridosiloxane composition produced by the process of claim 14 wherein said catalyst is selected from tetrabutylammonium chloride, and a solid phase catalyst which surface catalyzes the polymerization of the trihalosilane and organotrihalosilane monomers.

16. An organohydridosiloxane composition produced by the process of claim 15 wherein said catalyst is a solid phase catalyst which surface catalyzes the polymerization of the trihalosilane and organotrihalosilane monomers.

17. An organohydridosiloxane composition produced by the process of claim 15 wherein said catalyst is tetrabutylammonium chloride.

18. An organohydridosiloxane composition produced by the process of claim 12 wherein the hydridotrihalosilane is trichlorosilane, and the organo-trihalosilane is selected from the group consisting of methyltrichlorsilane, ethyltrichlorosilane, n-butyltrichlorosilane, t-butyltrichiorosilane, n-pentyltrichlorosilane, n-hexyltrichlorosilane, cyclohexyltrichlorosilane, phenyltrichlorosilane, and mixtures thereof.

19. An organohydridosiloxane composition produced by the process of claim 18, wherein said catalyst is a solid phase catalyst which surface catalyzes the polymerization of the trihalosilane and organotrihalosilane monomers.

20. An organohydridosiloxane composition produced by the process of claim 12 wherein said non-polar solvent is selected from the group consisting of pentane, hexane, heptane, cyclohexane, benzene, toluene, xylene, carbon tetrachloride, and mixtures thereof.

21. An organohydridosiloxane composition produced by the process of claim 12 wherein said polar solvent is selected from the group consisting of water, methanol, ethanol, isopropanol, glycerol, diethyl ether, tetrahydrofuran, diglyme, and mixtures thereof.

22. An organohydridosiloxane composition produced by the process of claim 21 wherein the polar solvent is hexane, and the non-polar solvent is a water and ethanol mixture.

23. The method of claim 1 wherein the ratio of the moles of water in said polar solvent to the sum of the moles of organotrihalosilanes and the moles of hydridotrihalosilanes in said monomer solution is less than or about equal to 2.

24. An organohydridosiloxane composition produced by the process of claim 12 wherein said resin comprises a caged structure.

25. An organohydridosiloxane composition produced by the process of claim 12 wherein said resin has essentially no hydroxyl or alkoxy groups bonded to backbone silicon atoms.

26. An organohydridosiloxane composition produced by the process of claim 12 wherein said polymer has a general formula:

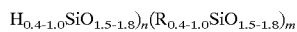

or

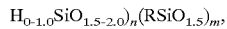

wherein the sum of n and m is from about 8 to about 5000 and R is selected from the group consisting of normal and branched alkyl groups, cycloalkyl groups, aryl groups, and mixture thereof.

* * * * *